(12) United States Patent
Morgan

(10) Patent No.: US 7,121,413 B2
(45) Date of Patent: Oct. 17, 2006

(54) ADJUSTABLE WIRE STORAGE RACK UNIT FOR POTS, PANS AND LIDS

(76) Inventor: Fletcher Morgan, 4990 Coquina Key Dr., SE., St. Petersburg, FL (US) 33705

( * ) Notice: Subject to any disclaimer, the term of this patent is extended or adjusted under 35 U.S.C. 154(b) by 439 days.

(21) Appl. No.: 10/194,287

(22) Filed: Jul. 15, 2002

(65) Prior Publication Data

US 2003/0168417 A1    Sep. 11, 2003

Related U.S. Application Data

(63) Continuation-in-part of application No. 29/156,657, filed on Mar. 6, 2002, now Pat. No. Des. 471,768.

(51) Int. Cl.
A47G 19/08    (2006.01)

(52) U.S. Cl. .................................................. 211/41.11
(58) Field of Classification Search ............. 211/41.11, 211/41.1, 41.2, 41.3, 41.4, 41.5, 41.6, 41.7, 211/181.1, 49.1, 175
See application file for complete search history.

(56) References Cited

U.S. PATENT DOCUMENTS

| | | | | |
|---|---|---|---|---|
| 46,934 A | * | 3/1865 | Moberg | 285/179 |
| 549,807 A | * | 11/1895 | Mayer | 211/66 |
| 1,001,416 A | * | 8/1911 | Lloyd | 211/74 |
| 1,065,000 A | * | 6/1913 | Sarter et al. | 211/41.11 |
| 2,190,065 A | | 2/1940 | Griffin | |
| 2,516,088 A | | 7/1950 | Einhorn | |
| 2,891,676 A | | 6/1959 | Miller | |
| 3,013,670 A | | 12/1961 | Mayer | |
| 3,164,108 A | | 1/1965 | Romero | |
| 3,200,959 A | * | 8/1965 | Theim | 211/50 |
| 3,693,808 A | * | 9/1972 | Rauch | 211/195 |
| 4,238,035 A | * | 12/1980 | Kassanchuk | 211/74 |
| 4,592,471 A | | 6/1986 | Bross | |
| 4,756,582 A | | 7/1988 | Heien | |
| 4,943,029 A | | 7/1990 | Szuster | |
| 5,016,847 A | * | 5/1991 | Herzig | 248/175 |
| 5,582,302 A | * | 12/1996 | Kozak | 211/74 |
| 5,649,630 A | * | 7/1997 | Remmler | 211/41.8 |
| 5,660,284 A | | 8/1997 | Vaughn | |
| D419,335 S | * | 1/2000 | Kopala, Jr. | D6/462 |
| 6,012,593 A | * | 1/2000 | Knittel et al. | 211/41.11 |
| 6,109,462 A | * | 8/2000 | Emalfarb et al. | 211/119 |

* cited by examiner

*Primary Examiner*—Sarah Purol
(74) *Attorney, Agent, or Firm*—John S. Hale; Gipple & Hale

(57) ABSTRACT

A wire storage rack for storing pots, pans, skillets and lids comprising a plurality of wire members, each of which is provided with a plurality of sleeve assemblies providing horizontal and vertical adjustment of the wire members. Each sleeve assembly is constructed of a sleeve with a freely rotatable threaded nut mounted on one end. A plurality of anchor legs are mounted to the sleeve assemblies for anchoring the wire storage rack and an offset "U" shaped wire member with a plurality of shaped upright rods is secured to said sleeve assemblies.

19 Claims, 4 Drawing Sheets

ADJUSTABLE WIRE STORAGE RACK UNIT FOR POTS, PANS AND LIDS

CROSS-REFERENCE TO RELATED APPLICATIONS

This a continuation-in-part application of U.S. Des. patent application Ser. No. 29/156,657 filed Mar. 6, 2002 now U.S. Des. Pat. No. D471,768 issued Mar. 18, 2003.

TECHNICAL FIELD OF THE INVENTION

The present invention generally relates to a storage rack unit and more specifically is directed toward an adjustable wire storage rack unit with horizontally and vertically moveable elements for holding cooking pots, pans, skillets and their respective lids which can be mounted into a cabinet or any flat planar surface.

BACKGROUND OF THE PRIOR ART

Most cooks have accumulated a collection of covered cookware that range over many sizes of pots and pans and containers with lids. Even those householders who do not consider themselves as real cooks have an assortment of covered containers in which to cook food both on top of a stove and in an oven. Thus almost all kitchens contain significant numbers of pots, pans and other cooking containers and lids for same. The cooking containers and their respective lids must be stored when they are not in use and this problem, may be compounded by the lack of storage space in many kitchens.

Where and how these cooking containers are stored may vary substantially from kitchen to kitchen. In some instances, pots and cooking containers are stacked in a nested fashion with the largest diameter pot on the bottom and successively smaller pots on top. While this might be a relatively efficient way to store pots, pans and other cooking vessels such as casseroles, the lids and covers usually cannot be stored effectively in a nested stack. Most kitchens which use this nesting stack storage method for pots also have a disorganized pile of lids and covers. The cook then must rummage through the pile to locate the correct lid for the container he or she wants to use and move stacks of containers. In a home kitchen this exercise is very frustrating and can be quite chaotic when people and children gather in the kitchen during cooking of the meal.

Some cooks simply cover their pots and pans with the lids and store them side-by-side on cabinet shelves. Although this method allows the cook to locate the correct lid quickly, it requires significantly more storage space than stacking or nesting the containers. Many home kitchens simply do not have the storage space to store the numbers of cooking containers required by large families or serious cooks.

The present inventive wire storage rack unit is useful for holding pots, pans, skillets and lids for same. In the prior art, shaped wire stands have been used to elevate an appliance or cooking container or to provide open storage for related use utensils, splatter screens and similar items.

U.S. Pat. No. 2,516,088 issued Jul. 18, 1950 is directed toward a folding dish drying rack formed from round wire stock which has a protective coating of rubber or synthetic resin. A plurality of elements are pivotally supported between an adjacent pair of longitudinal rods. Each element is mounted with a crank portion positioned outwardly and a lug portion positioned inwardly for attachment to and manipulation by a push bar. A push bar is slidably mounted in slots formed in a pair of mounting plates secured to the ends of a base.

U.S. Pat. No. 5,660,284 issued Aug. 26, 1997 is directed toward a storage rack for holding and storing cooking container lids and like shaped objects. The rack has a base with a pair of feet allowing it to be placed in a vertical or horizontal position. A plurality of adjustable crosspieces forming rests or steps are positioned at desired locations along the edges of the bracket members to hold the container lids at a storage angle.

Other commonly used types of stands are a wire rack with legs and supports such as that shown in U.S. Pat. Nos. 2,190,065, 2,891,676, 3,013,670, 3,164,108, 4,592,471, 4,756,582 and 4,943,029.

The prior art, therefore, has failed to provide a wire storage rack or holder for cooking containers and their lids and covers that may be easily mounted in a cabinet or on any flat surface by the purchaser or by a consumer which can be easily adjusted in both horizontal and vertical orientations as needed to hold and store a number of containers and lids of varying and different dimensions. Consequently, there is a need for such a rack in the home kitchen to allow storage areas to be organized effectively and to reduce clutter and provide the time savings which result when storage spaces are organized.

Accordingly, the novel wire storage rack unit has been developed to hold pots, pans, skillets and lids which resolves the problems of counter and cabinet space, cluttered storage, mislaid lids, matching lids to containers, allowing containers and lids to be consolidated and hidden from sight in a cabinet or enclosed area, as well as being easily cleaned.

SUMMARY OF THE INVENTION

The present invention is directed toward an adjustable plastic coated wire storage rack unit comprising a wire rack with moveable elements which can be mounted on any planar surface. The wire rack has parallel side posts provided with threaded ends and a sleeve assembly which is rotatably mounted on a threaded portion of the post. The bottom section of each post is connected to an "L" shaped leg assembly having a wire body with threaded portion having a sleeve assembly mounted thereon. Each sleeve assembly is formed with a tubular sleeve and a rotatable nut mounted to the sleeve. The nut can rotate independently of the sleeve and is threadably engaged with a threaded portion of the post.

An offset "U" shaped member having a plurality of upright angled rods secured to offset "U" shaped wire members is mounted in the distal end of the each post sleeve.

It is an object of the present invention to provide a storage rack for cooking containers and their covers and lids which has been previously assembled and can be easily mounted by the purchaser or consumer to accommodate a specific collection of cooking containers and lids without the need of tools, fasteners or adhesives.

It is an additional object of the present invention to provide for a storage rack which can be horizontally and vertically adjusted.

It is a further object of the present invention to provide an adjustable storage rack for cooking containers and lids that can be sized to hold all of the containers and/or lids for a selected set or brand of cookware.

It is yet another object of the invention to provide a storage rack which can be easily mounted to a flat surface with a minimum of instructions and general lack of mechanical skill by the consumer.

It is a further object of the invention to provide an adjustable storage rack which may be easily and inexpensively fabricated from round wire stock or other suitable materials having strength and durability.

In the accompanying drawings, there is shown illustrative embodiments of the invention from which these and other objectives, novel features and advantages will be readily apparent.

DETAILED DESCRIPTION OF THE INVENTION

Figure 1:
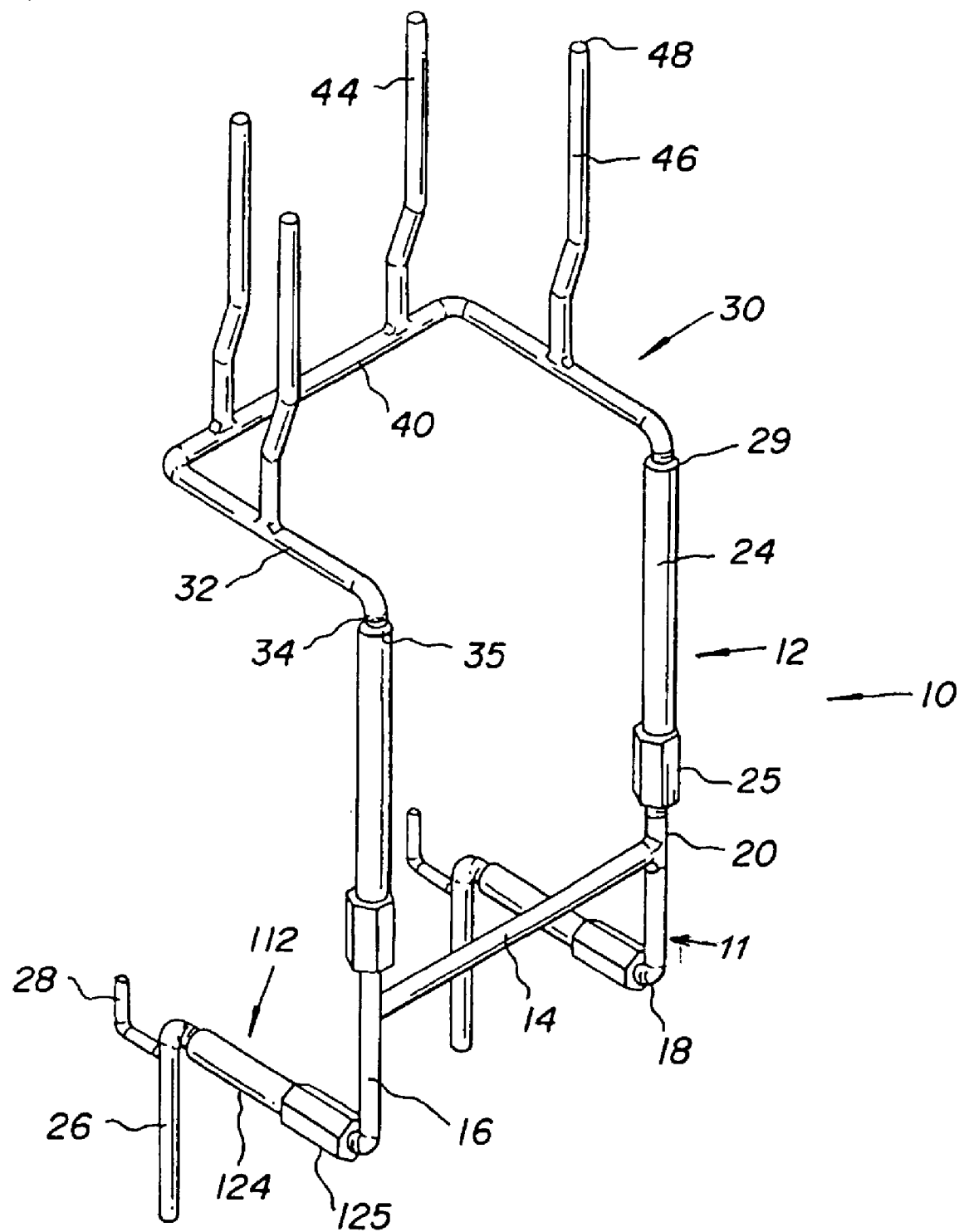
FIG. 1 is a perspective view of the adjustable storage rack for pots, pans and lids.
Figure 2:
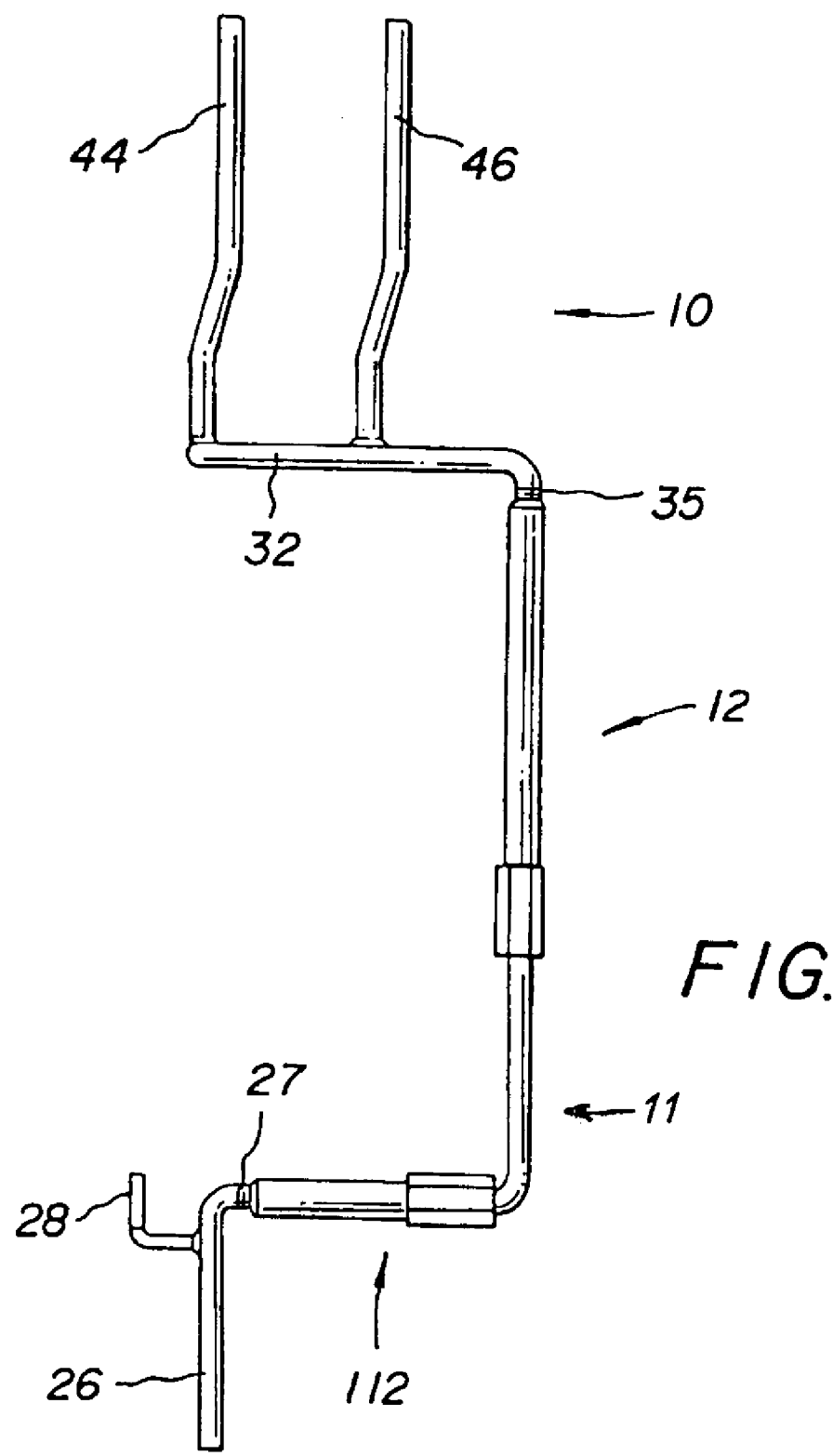
FIG. 2 is a side elevational view of the storage rack of FIG. 1.
Figure 4:
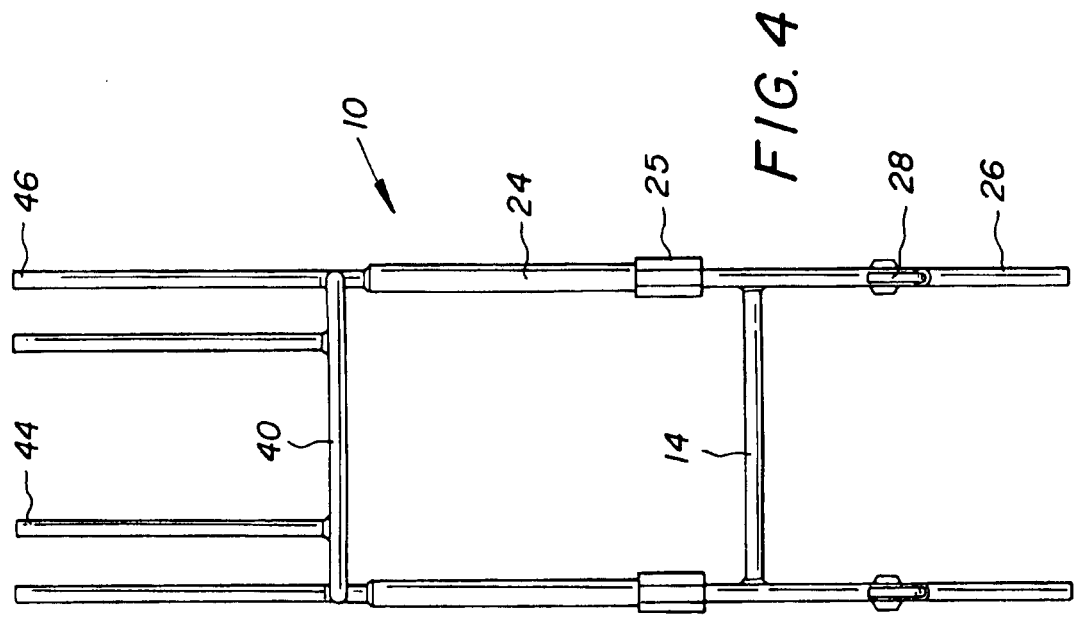
FIG. 4 is a rear elevational view of the storage rack of FIG. 1.
Figure 3:
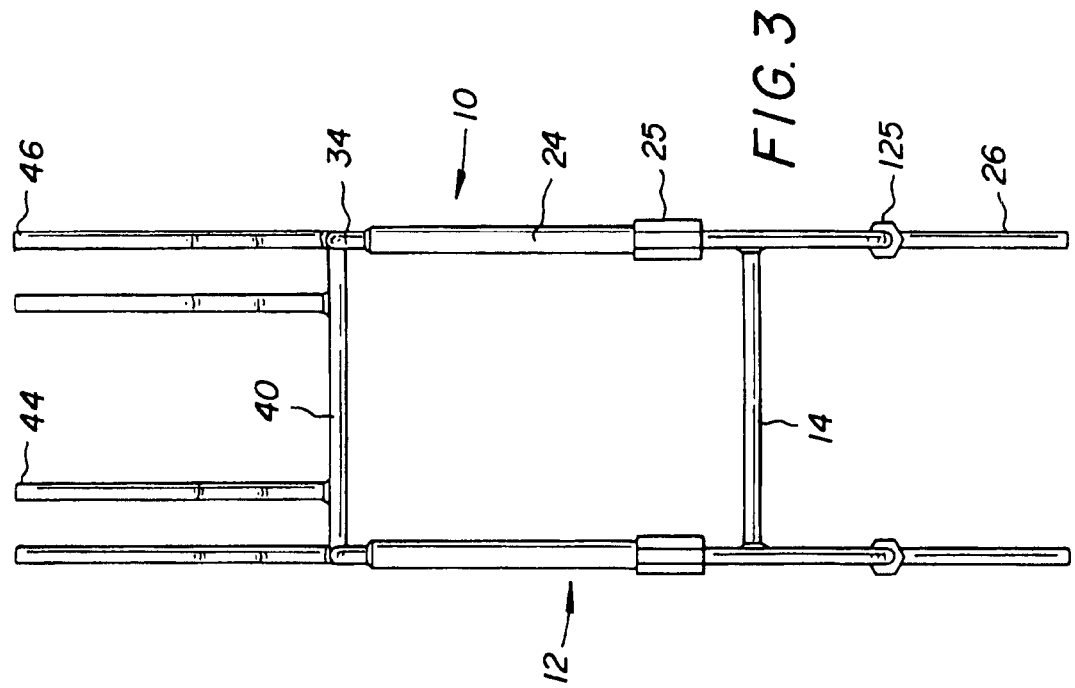
FIG. 3 is a front elevational view of the storage rack of FIG. 1.
Figure 5:
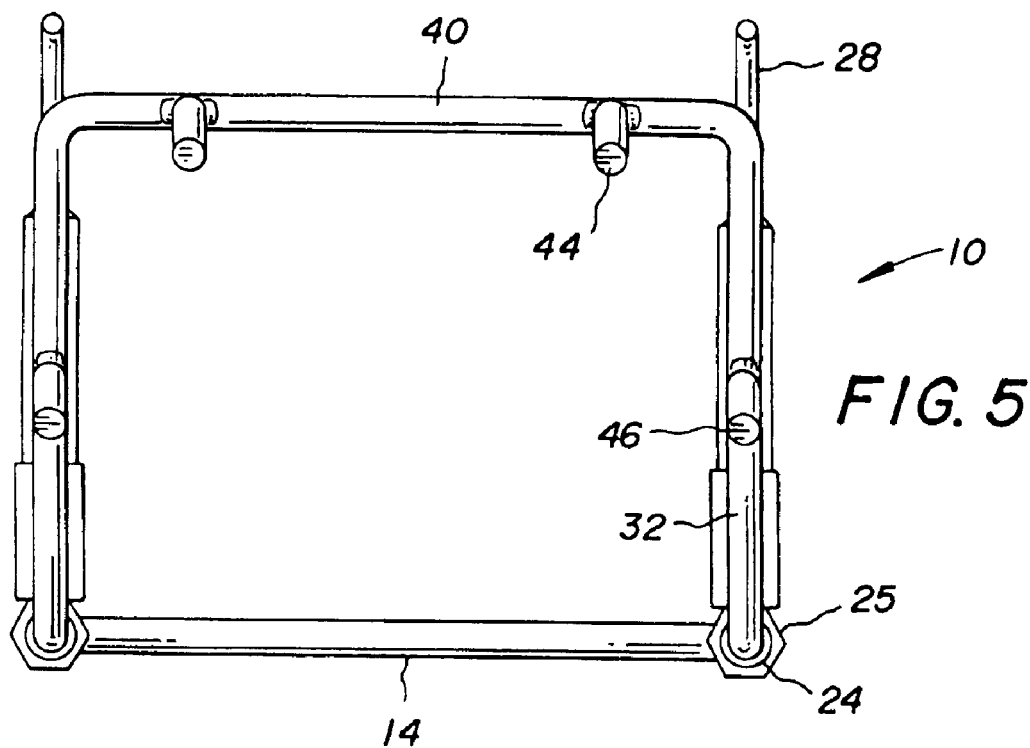
FIG. 5 is a top plan view of the storage rack shown in FIG. 1.
Figure 6:
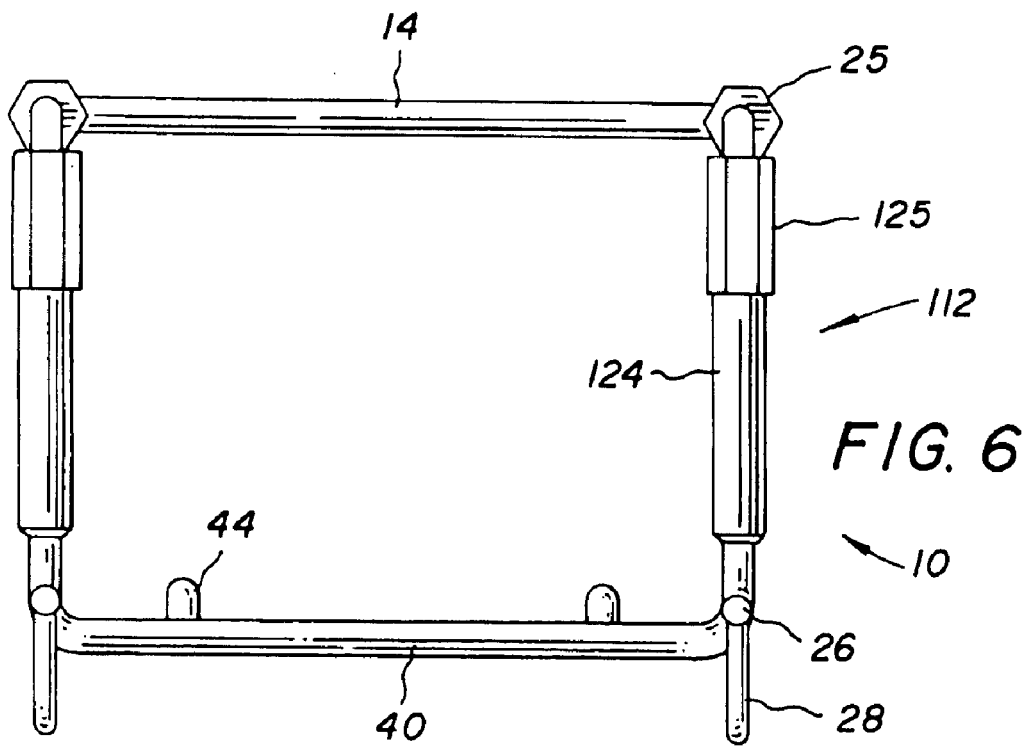
FIG. 6 is a bottom plan view of the storage rack shown in FIG. 1.

The adjustable wire storage rack of the present invention is ideally suited for use in the home as it provides a compact storage rack for containers and their respective lids and covers that allows easy access to the same. The capability to vary the height and horizontal relationship of the component parts allows the consumer to customize the rack as needed to hold a varied assortment of containers and lids. The preferred embodiment of the storage rack of the present invention is designed to be easily mounted by the user and is fully adjustable to hold a number of cooking containers and their respective lids of different sizes and diameters at an optimum storage angle.

The preferred embodiment and best mode of the adjustable wire storage rack invention is shown in FIGS. 1–6. The adjustable pot, pan and lid storage rack assembly 10 is constructed with two parallel side posts assemblies 11 and a lower cross support member 14 connecting the side posts 16. The elements of the posts, legs and "U" shaped offset member are constructed of round wire stock.

Each post assembly 11 has a lower "L" shaped wire post 16 bent at 90° angle on its bottom end to form a connector arm 18. The post 16 is threaded at the connector arm 18 and at its distal end 20 to receive a sleeve assembly. Each post sleeve assembly has a tubular sleeve member 24 with a freely rotatable threaded nut 25. A second leg sleeve assembly 112 has a tubular sleeve member 124 with a freely rotatable threaded nut 125. The sleeve assemblies 12 and 112 are respectively mounted on the distal threaded portion end 20 and connector arm 18. An anchor leg 26 having an angular or transverse section 27 is threaded into sleeve 112. The distal ends of anchor legs 26 are provided for insertion into holes previously drilled in a planar surface. A notch member 28 is secured to the anchor leg 26 and extends outward from same and together with the anchor leg forms a "C" shaped retaining area. A lower support cross bar 14 connects the lower ends of the side post assemblies 12 below the post distal end 20. It will be appreciated that while sleeves 24 and 124 are internally threaded at their distal ends away from nuts 25 and 125 they can alternatively be provided with a smooth surface inner bore to provide a friction fit of the associated male member.

An offset member 30 is mounted on the distal ends 29 of tubular sleeve member 24. Each wire support offset member 30, as seen in the FIGS. 1–6, is constructed with two parallel arms 32 with downwardly angularly extending feet 34 having a threaded portion 35 mounted in the threaded top of the tubular sleeve 24. The extending feet 34 of the offset member can also be friction fit in the distal ends 29 of the tubular sleeve 24 as previously noted or can be threaded as shown in FIG. 1, so that an internally threaded tubular sleeve 24 can be screwed along the threaded portion 35 to raise or lower the offset member 30. The offset member 30 has a "U" shaped configuration with a cross bar support 40 connecting the parallel arms 32. Two angled offset upright rods 44 are mounted to the cross bar 40 a distance inside the parallel axes of the arms 32 and two angled offset upright rods 46 are mounted to the parallel arms 32 outside of the upright rods 44. Each of the angled offset upright rods 44–46 is formed with a blunt or rounded end 48 to preclude scratching of the cooking container and lids. In addition, each wire component, excepting the threaded areas, is preferably coated with a rubber, a rubberized material or plastic coating such as PVC to prevent scratching of the cooking utensils and to protect the wires against rust.

In operation, two holes of substantially the same diameter as the diameter of anchor legs 26 are drilled into the planar surface (cabinet shelf block, etc.) spaced apart a distance equal to the distance between the anchor legs 26 and the anchor legs 26 are friction fit into the holes so that the anchor legs support the wire rack. The respective sleeve assemblies 12 and 112 can be rotated to arrive at a designated height or length for the rack to accommodate the particular cooking container or lid. The rack 10 can be easily removed from the anchor holes drilled in the planar surface and manually cleaned or placed in a dishwasher for cleaning.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present inventions defined by the following claims.

What is claimed is:

1. An adjustable wire storage rack comprising two post assemblies and an offset member mounted to said post assemblies, said post assemblies providing selective adjustment of the height and length of said storage rack wherein said offset member is "U" shaped with a plurality of rods secured to and extending upward and away from said offset member.

2. An adjustable wire storage rack as claimed in claim 1 wherein said rods are angled in at least two areas.

3. An adjustable wire storage rack as claimed in claim 1 wherein said wire storage rack is coated with plastic.

4. An adjustable wire storage rack comprising a plurality of wire member assemblies, each of said wire member assemblies comprising a pair of "L" shaped posts with at least one end portion being threaded, a sleeve assembly mounted to a threaded portion of said post, said sleeve assembly comprising an internally threaded sleeve member and a freely rotatable nut mounted on said sleeve member, an anchor leg assembly mounted to said sleeve assembly and a cross member mounted to and connecting said posts.

5. An adjustable wire storage rack as claimed in claim 4 wherein said sleeve member has a throughgoing bore.

6. An adjustable wire storage rack as claimed in claim 5 wherein said sleeve bore is internally threaded.

7. An adjustable wire storage rack as claimed in claim 4 wherein said anchor leg assembly has an "L" shaped leg member and a sleeve assembly comprising an internally threaded sleeve member and a freely rotatable nut mounted on said "L" shaped leg member.

8. An adjustable wire storage rack comprising a plurality of wire members, said wire members being provided with sleeve assemblies providing horizontal and vertical adjustment means, each sleeve assembly comprises a hollow tube with a freely rotatable threaded nut mounted on one end, an offset "U" shaped wire member mounted to said wire members, said offset "U" shaped member being provided with a plurality of upright rods secured thereto.

9. An adjustable wire storage rack as claimed in claim 8 wherein said rods are formed with at least one angled portion.

10. An adjustable wire storage rack as claimed in claim 8 wherein said rods have a rounded end.

11. An adjustable wire storage rack as claimed in claim 8 wherein said wire members are coated with plastic material.

12. An adjustable wire storage rack as claimed in claim 11 wherein said plastic material is polyvinylchloride.

13. An adjustable wire storage rack as claimed in claim 8 wherein said hollow tube is internally threaded.

14. An adjustable wire storage rack as claimed in claim 8 wherein said hollow tube has a smooth inner bore.

15. An adjustable wire storage rack as claimed in claim 8 wherein said sleeve assemblies have a lower support cross arm connecting them together.

16. An adjustable wire storage rack comprising a plurality of wire members provided with height adjustment means, said height adjustment means comprising a plurality of threaded posts threaded on both ends and a sleeve with a rotatable nut threadedly mounted on one end of each threaded post, an anchor assembly mounted to the other end of each said post and an offset "U" shaped wire member mounted to said post sleeves, said offset "U" shaped wire member comprising parallel legs with downward turned sections, a cross bar connecting said parallel legs and a plurality of upright rods secured to said parallel legs and cross bar.

17. An adjustable wire storage rack comprising a plurality of wire members, said wire members comprising post members with sleeve assemblies mounted thereto to provide vertical adjustment means, each sleeve assembly comprises a tube sleeve with a freely rotatable threaded nut mounted on one end mounted to said post member, an anchor leg assembly mounted to said post member, said anchor leg assembly comprising an "L" shaped leg member and a sleeve assembly comprising a sleeve member and a freely rotatable nut mounted on said "L" shaped leg member to provide horizontal adjustment means and an offset "U" shaped wire member mounted to a tube of said post members sleeve assemblies, said offset "U" shaped member being provided with a plurality of support rods secured thereto.

18. An adjustable wire storage rack as claimed in claim 17 including a notch member secured to said "L" shaped leg member.

19. An adjustable wire storage rack comprising two post assemblies and an offset member mounted to said post assemblies, said post assemblies providing selective adjustment of the height and length of said storage rack, each of said post assemblies comprising an "L" shaped post with at least one end portion of said post being threaded, a sleeve assembly mounted to a threaded portion of said post, said sleeve assembly comprising a sleeve member and a freely rotatable nut mounted on said sleeve member.

* * * * *